(12) United States Patent
Atkinson et al.

(10) Patent No.: US 7,962,378 B2
(45) Date of Patent: Jun. 14, 2011

(54) PROCESS AND METHODOLOGY TO MAINTAIN CONSISTENCY ACROSS DISPARATE INTERFACED SYSTEMS

(75) Inventors: Charles S. Atkinson, Apex, NC (US); Hima K. Goverdhana, Cary, NC (US); Daniel P. Huskey, Raleigh, NC (US); Shrish Javalkar, Cary, NC (US); Anandakrishnan Narayanan, Morrisville, NC (US); William J. Reilly, Cary, NC (US); Allen J. Scribner, III, Fuquay-Varina, NC (US); Derdre A. Wessel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1012 days.

(21) Appl. No.: 11/773,480

(22) Filed: Jul. 5, 2007

(65) Prior Publication Data

US 2009/0012960 A1    Jan. 8, 2009

(51) Int. Cl.
*G06Q 30/00* (2006.01)
(52) U.S. Cl. .................. 705/26.81; 705/26.1; 705/26.8; 705/27.1
(58) Field of Classification Search .................. 705/26, 705/27
See application file for complete search history.

(56) References Cited

U.S. PATENT DOCUMENTS

| | | | |
|---|---|---|---|
| 2007/0198599 A1* | 8/2007 | Tobies | 707/201 |
| 2008/0228589 A1* | 9/2008 | Koehler et al. | 705/26 |
| 2009/0049303 A1* | 2/2009 | Hart et al. | 713/176 |

OTHER PUBLICATIONS

"e-Consumer Complaints About On-line Stores" Nasir, V Aslihan. Journal of Consumer Satisfaction, Dissatisfaction & Complaining Behavior, v17, p. 68-87, 2004. Retireved via Dialog.*

* cited by examiner

*Primary Examiner* — Michael A. Misiaszek
(74) *Attorney, Agent, or Firm* — Scully, Scott, Murphy & Presser, P.C.; John Pivnichny

(57) ABSTRACT

A process and methodology are disclosed to maintain consistency across disparate systems. An interface is provided comprised of a fulfillment client in which to place orders, a middleware to pass data, manufacturing and shipment systems to process orders, and a shipping and packing information repository system to house data. The methodology implements, inter alia, remote function calls to the asynchronously/synchronously interfaced systems during defined points of order processing to establish the status of the systems availability and the status of the order at the exact time of a predetermined activity. Also, information regarding the order status is posted as both a displayed on-line message to a user and in distinct status fields for future review. Furthermore, this method dynamically reacts to failed communication through the resetting of orders to a previous state to ensure data integrity across the distributed computing environment.

2 Claims, 3 Drawing Sheets

PROCESS AND METHODOLOGY TO MAINTAIN CONSISTENCY ACROSS DISPARATE INTERFACED SYSTEMS

BACKGROUND OF THE INVENTION

1. Field of the Invention

This invention generally relates to data processing, and more specifically, the invention relates to a process and methodology to maintain consistency across disparate interfaced systems. Even more specifically, the preferred embodiment of the invention relates to a process for interfacing of a customer order to manufacturing and shipment systems as well as a shipping and packing information repository.

2. Background Art

Customers who order items that are manufactured for the customers often deal with several different groups of people at the manufacturer, and each of these groups may have their own computer system or systems. For example, a particular customer who wants an item manufactured may deal with manufacturing and shipment systems of the manufacturer as well as a shipping and packing information repository of the manufacturer. A particular customer order may be sent to both of these systems, and both systems may use and process data items in the order.

The architecture of the landscape dictates the need for interfacing of a customer order to these two series of systems: the manufacturing and shipment system as well as the shipping and packing information repository. Currently, there are no known methods to support this environment in handling the consistency between disparate interfaces.

The downstream Manufacturing & Shipment systems are asynchronously interfaced to through an intermediary system using the standard SAP IDoc processing function and an existing legacy function. Following are the drawbacks to this function: the legacy application is not able to support a change to a new synchronous interfacing functionality; this legacy function is unavailable for change due to it's current use in other applications; the SAP IDoc function does not support synchronous communication; and the status of the order as well as any failures in the processing of the communication in the downstream system are not recognized in the sending application. This leads to the following situations: (1) Disparate information in the systems within the architecture which is unrecoverable; 2) Inefficient communication; (3) Customer dissatisfaction; and (4) Additional rework cost and effort to support reconciliation of the systems.

The procedure to determine the status of the order in the Manufacturing & Shipment systems is manual. This procedure requires contacting the Manufacturing & Shipment system relevant for a given material, which is subject to the availability of the Manufacturing & Shipment system personnel.

The downstream Shipping & Packing Information Repository system will be synchronously interfaced to through a middleware exchanging data in a more flexible format. The synchronous interfacing is through an intermediary system, which reformats the information in a structure that is legible to the Repository.

While this is the preferred method, there are drawbacks when used as a component in a distributed architecture of disparate interface functionality if processes are not implemented that support the distinctions of each environment. These drawbacks include: the inability to take advantage of the value add of the synchronous interchange; and the timely representation of current order information not effecting the outcome of the exchange with the asynchronous environment the same disparate information existing in the systems within the architecture. This leads to the same issues encountered with an asynchronous exchange. Specifically: (1) Disparate information in the systems within the architecture which is unrecoverable; (2) Inefficient communication; (3) Customer dissatisfaction; and (4) Additional rework cost and effort to support reconciliation of the systems.

SUMMARY OF THE INVENTION

An object of this invention is to provide an effective means of handling the communication in a distributed environment in which disparate interfacing functionality is utilized.

Another object of the invention is to support useful and timely information exchange, maintenance of data and order consistency, and controlled interaction between disparate systems to minimize system-processing overhead.

These and other objectives are attained with a process and methodology to maintain consistency across disparate interfaced systems. The preferred embodiment of the invention comprises: (i) a single parameter setting to enable the inclusion of the synchronously interfaced system into the environment; (ii) implementation of remote function call functionality to the synchronous system during critical points of the order create and change function to establish the status of the system availability and the status of the order at the exact time of the activity; (iii) posting of the information regarding the order status as both a displayed on-line message to the user as well as in distinct status fields for future review; (iv) provide the user the flexibility to continue or discontinue processing based on the status of the order; and (v) table driven function to drive the times at which exchange with the systems is required. The exchange would only be engaged based on changes affecting data elements relevant to that system.

The invention also preferably comprises: (vi) implementation of function to support limitation of changes allowed for an order that is considered unavailable for change based on status in the shipment process; (vii) implementation of function to support the suppression of output to all systems in the distributed environment when the system status indicates lack of availability; (viii) implementation of function to support the suppression of output to all systems in the distributed environment when the order status indicates the need to suspend output based on the condition of the order or the position of the order in the shipment processing function; and (ix) dynamic reaction to failed communication through the resetting of an order to the previous state to ensure data integrity across the landscape.

The preferred embodiment of the invention, described below in detail, provides a number of important advantages. For instance, this embodiment provides the ability to take advantage of the benefits of the use of synchronous system in a distributed environment without disrupting the asynchronous legacy function or causing legacy rework; and the ability to seamlessly insert additional business into the interface to the Shipping & Packing Information Repository. The invention also provides the required timely reflection of order status, as well as data consistency within the components of the distributed environment; and elimination of the manual procedure required to determine the current order status in the Manufacturing & Shipment systems. The preferred embodiment further provides management of consistent data between the components of the distributed environment; and minimal interchange between the systems with communication engaged only based on specific order updates; i.e., reduction in network traffic and system overhead.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

The preferred embodiment of the invention comprises: (i) a single parameter setting to enable the inclusion of the synchronously interfaced system into the environment; (ii) implementation of remote function call functionality to the synchronous system during critical points of the order create and change function to establish the status of the system availability and the status of the order at the exact time of the activity; (iii) posting of the information regarding the order status as both a displayed on-line message to the user as well as in distinct status fields for future review; (iv) provide the user the flexibility to continue or discontinue processing based on the status of the order; and (v) table driven function to drive the times at which exchange with the systems is required. The exchange would only be engaged based on changes affecting data elements relevant to that system.

Preferably, the invention further comprises (vi) implementation of function to support limitation of changes allowed for an order that is considered unavailable for change based on status in the shipment process; (vii) implementation of function to support the suppression of output to all systems in the distributed environment when the system status indicates lack of availability; (viii) implementation of function to support the suppression of output to all systems in the distributed environment when the order status indicates the need to suspend output based on the condition of the order or the position of the order in the shipment processing function; and (ix) implementation of function to support a dynamic reaction to failed communication through the resetting of an order to the previous state to ensure data integrity across the landscape.

Figure 1:
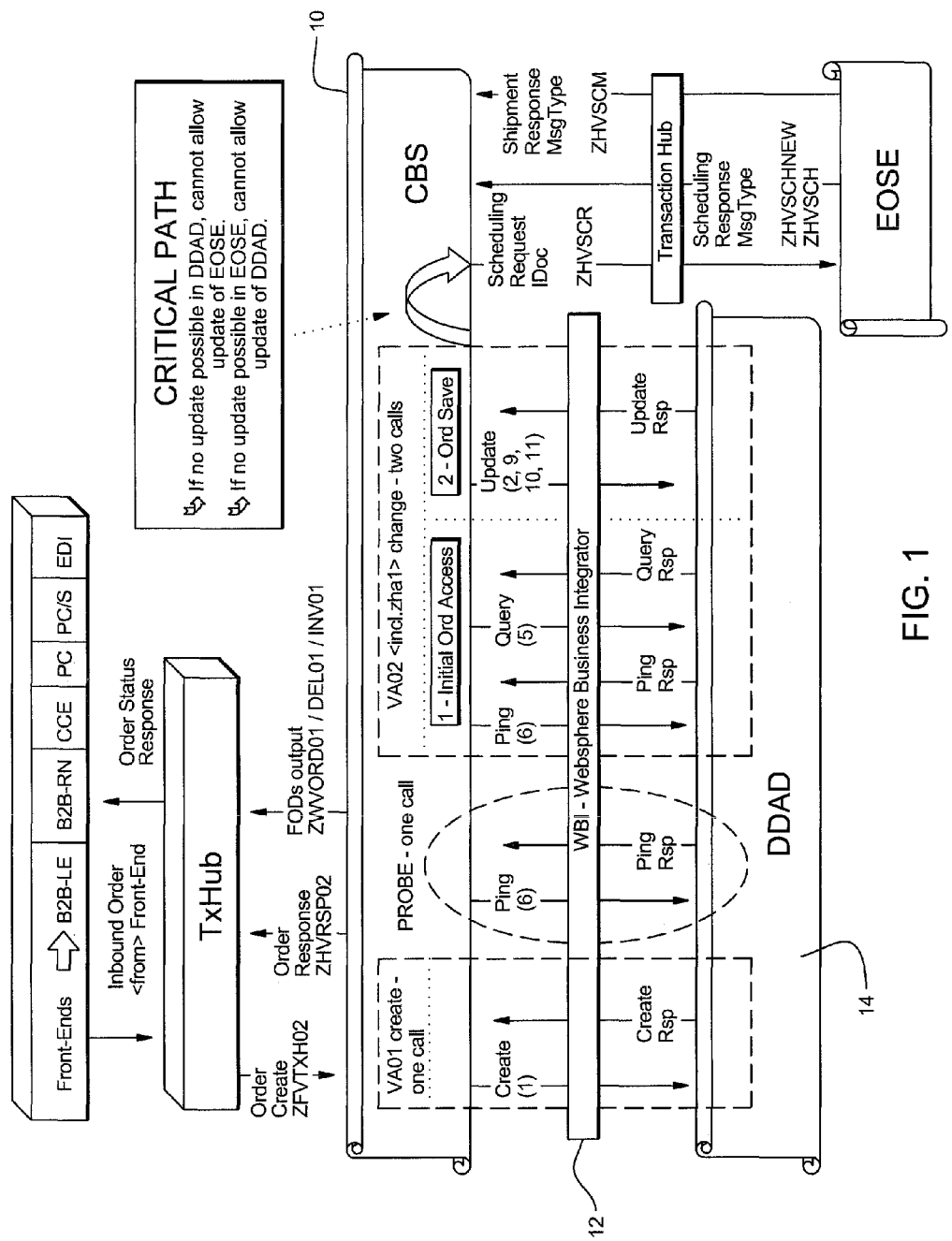
FIG. 1 illustrates a process flow embodying the present invention.

FIG. 1 illustrates a process flow embodying the present invention. This Interface is comprised of a Fulfillment client 10 (SAP CBS—Cross Brand Solutions) in which orders are placed, a middleware 12 (WBI—Websphere Business Integrator) through which data is passed, and the Shipping & Packing Information Repository system 14 (DDAD—Direct Delivery Address Database) in which the data necessary to pack and ship product is housed. The Shipping & Packing Information Repository also houses the shipment processing status of the customer order and passes that data back to the Fulfillment client through the middleware.

The interfacing of data to the Shipping & Packing Information Repository 14 is contingent on the availability of the middleware and the Shipping & Packing Repository System as well as the ability to update the legacy Manufacturing Systems.

In accordance with the preferred embodiment of the invention, an agreed to number of data elements in the customer's order which are relevant for packing and shipment processing are passed from the Fulfillment client 10 (SAP CBS) to the middleware 12 (WBI). The middleware formats the data into a format that is legible to the Shipping & Packing Information Repository system. The data is passed to the Shipping & Packing Information Repository system for storage and extraction by the downstream manufacturing systems. If the middleware or Shipping & Packing Information Repository system is not available, and/or the legacy Scheduling & Manufacturing Interface System will be unable to be updated due to failures in the order processing, the customer's order is saved however, it is blocked from being routed to both the Shipping & Packing Repository and the Scheduling & Manufacturing system. A delivery block is placed at the header of the order, a workflow is initiated to alert the user, and a status field is updated to indicate the current status of the order.

Future updates to the order are passed to the Shipping & Packing Information Repository system 14. Before attempting to update the Shipping & Packing Information Repository system, an RFC is made to establish the availability of the middleware and Shipping & Packing Repository system as well as the status of the customer order. If the middleware and/or the Shipping & Packing Repository are not available, the user attempting the change in the Fulfillment system is alerted via and on-line message. The fields that are relevant for storage in the Shipping & Packing Repository are made unavailable for editing, and the order is not passed to the Scheduling & Manufacturing system. If there is continued order processing issues that would prevent the order from routing to the Scheduling & Manufacturing system, the order is prevented from routing to the Shipping & Packing Repository system. If the customer's order is in the process of being shipping, the user on the Fulfillment client is notified via a message indicating the locked status of the order. The fields that are relevant for storage in the Shipping & Packing Repository are made unavailable for editing. The fields that are relevant to the Scheduling & Manufacturing System are also made unavailable for editing. If the middleware and Shipping & Packing Repository are available, the customer's order has not started the shipment process, and the order processing issues have been resolved, the order is made available for updating. If during the order update activity, the customer's order begins the process of shipment, the user is notified via an express document. The changes made to the order are not saved, and the order does not route to the Shipping & Packing Repository or to the Scheduling & Manufacturing system.

To support the processing, the following are required.
Fields and Tables

There are fields on the Fulfillment Order (Header and Line Item) that are updated based on the response to the call to the Shipping & Packing Repository. These fields include a Status Code field, a Result Code field, and a Result Code Message class.

The Status Code field indicates the relevancy of an SAP Order/order item and its status in the Shipping & Packing Repository. The possible values are NA, NU, U and L. NA indicates that the order/order item is not applicable to routing to the Shipping & Packing Repository, and NU indicates that the order/order item is applicable to routing to the Shipping & Packing Repository but not updated in that system. U indicates that the order/order item is applicable to and updated in the Shipping & Packing Repository, and L indicates that the order/order item is applicable to Shipping & Packing Repository but currently reflected as impending shipment.

The L is applied based on a response from Shipping & Packing Repository indicating that the order item is LOCKED. However, the L is also applied within the Fulfillment client when a delivery is created against the line item and the line item did not already reflect an L status. This is to ensure consistency in the information reflected at the line item level. The STATUS CODE field is editable ONLY WHEN THE STATUS is L. The value can only be changed to an E to indicate the unlock process (an exception process) has been engaged. However, once a delivery has been created against an order line item, the STATUS CODE field cannot be changed, even when the L is present. For SEO BUNDLES, which can contain multiple items relevant for the Shipping & Packing Repository, when one of those items is LOCKED, the entire SEO BUNDLE is locked. The change in the STATUS CODE field from L to E must be made to all items relevant to the Shipping & Packing Repository.

The RESULT CODE is issued from Shipping & Packing Repository for indicating the results of the RFC made to the system. The result codes indicate whether there are connectivity issues, database issues, or file feed format issues. The codes also indicate whether the order/order item is unavailable for change based on impending shipment.

The RESULT CODE Message class houses all the result codes and their description.

There are tables in the Fulfillment system used to regulate the Interface function. These Tables include a ZWVDDAD Table and a ZWV_DDADRFC Table. The ZWVDDAD Table is the Interface Table. This table is used both by code as well for informational purposes to indicate items NOT RELEVANT for the Shipping & Packing Repository, the fields which are considered triggers for an RFC to the Shipping & Packing Repository, and the fields relevant for locking (i.e., being made unavailable for editing) when the Order/Order item is impending shipment. The ZWV_DDADRFC table is used to house any rules for specialized extraction.

Interface Processing.

Interface Processing uses Function code, which is the code used internally in the processing to indicate to the middleware and the Shipping & Packing Repository the order activity. The function codes used support standard functions and specialized functions. The extraction is handled so as to minimize the amount of data flowing between the systems. Only those elements relevant for the Shipping & Packing Repository that are changed are passed. They are highlighted to the middlesware as changed via a field indicating updated. If there are data elements that are both Header and Line Item, the Header data only is passed if the information is the same at both the Header and Line Item level.

The extraction is handled to ensure the 'logical groups' of data elements are passed when an element within the group is changed. An example is the Ship-to Address information. The 'logical group' includes several lines used for the Company Name, the Street Address, the City/State/Province/Country/ Zip Code/Postal Code. If any of these elements are changed, the whole group is passed.

Order Create and Order Change.

During the order create process, there is only one call made to the Shipping & Packing Repository. The call is made at Order Save. If the response from the Shipping & Packing Repository is the update was successful, the Status Code field will be updated with a U, and the Result Code field will be blank or updated with a 00. If the response from the Shipping & Packing Repository is the update was not successful, the Status Code field will be updated with an NU, the Result Code field will be updated with the result code value as passed back from the Shipping & Packing Repository, and—if no other delivery block exists—a Header Delivery Block will be applied to the order. The user status will remain in PEND. The order will not be routed to the Shipping & Packing Repository or to the Scheduling & Manufacturing system. Application of a Header Delivery Block will result in a WORKFLOW indicating that the order has not been sent to the Shipping & Packing Repository (as well as not sent to the Scheduling & Manufacturing system).

During the order change process, there are two calls made to the Shipping & Packing Repository. A call is made as the user enters the order, and another is made at Order Save. The first call made to the Shipping & Packing Repository can be a PING to ascertain availability of the middleware and the Shipping & Packing Repository, or a QUERY to determine the status of the Order Items in the Shipping & Packing Repository.

A PING is used when the order/order items did not update the Shipping & Packing Repository in the previous order create/change. A ping is used only when the previous order activity resulted in or retained a Status Code of NU (not updated in the Shipping & Packing Repository). If the ping is successful, no information will be displayed upon entering the order and the user is free to make adjustments as needed. If the ping is not successful, a message will be displayed regarding the lack of success and the user will be given the opportunity to decide whether to continue or not. When the initial call is a Ping, opting to continue will allow the user to make adjustments to all fields.

A QUERY is used when the order/order items updated the Shipping & Packing Repository in the previous order create/ change. A Query is used when the previous order activity resulted in a Status Code of U (updated in the Shipping & Packing Repository). If the query is successful, no information will be displayed upon entering the order and the user is free to make adjustments as needed. If the query is not successful, a message will be displayed regarding the lack of success and the user will be given the opportunity to decide whether or not to continue. When the initial call is a Query, and the query response indicates lack of success, fields relevant for the Shipping & Packing Repository and fields relevant for the Scheduling & Manufacturing system will be rendered either not editable or changes made to the fields will not be posted. The affected fields are reflected in the table ZWVDDAD.

The second call to the Shipping & Packing Repository is at Order Save. If the response from the Shipping & Packing Repository is successful update, the Status Code field will be updated with (or retain) a U, and the Result Code field will be blank or updated with a 00. If the response from the Shipping & Packing Repository is the update was not successful, the Status Code field will either retain an NU or a U (depending on the status prior to the call), the Result Code field will be updated with the result code reflecting the problem. A list of result codes and their descriptions are housed in an independent message class. If the status is an NU, a Header Delivery Block will be applied to the order, if no other delivery block exists. The user status will remain in PEND. The order/order item will NOT be routed to the Shipping & Packing Repository or to the Scheduling & Manufacturing system. The STATUS CODE and RESULT CODE fields are able to be viewed on the order.

Specialized Processing

If the call made to the Shipping & Packing Repository indicates the order/order items are impending shipment, the Status Code field is updated to an L. If the response from the Shipping & Packing Repository is the items are impending shipment, agreement must be received from the manufacturing system(s) responsible for shipping the order/order items to allow for updated processing of the order. These systems also update the Shipping & Packing Repository with the shipment status of the order. The manufacturing system also can remove the order from an impending shipment status.

Once the order/order items is removed from an impending shipment status in the Shipping & Packing Repository, the Status Code on the order can be changed to an E, and order updates may be made. If the manufacturing system did not remove the order from an impending shipment status, the second call to the Shipping & Packing Repository will again return the impending shipment status. The Status Code will be adjusted to L (locked), and the changes made to the order will not be accepted. The order/order items will not route to the Shipping & Packing Repository or to the Scheduling & Manufacturing System.

The "Line Item Split" function is also supported within the Shipping & Packing Repository interface. The Line Item Split function provides the ability to separate specific order line items within an order. The function provides for the ability to retain the same basic order line item information across the newly separated line(s), but allow for changes to specific information in accordance with customer needs. During the Line Item Split process, there are two calls made to the Shipping & Packing Repository. A call is made as the user enters the function, and another is made Save. The first call may be either a Query or a Ping.

A QUERY is used when the order/order items updated the Shipping & Packing Repository in the previous order create/change. A Query is used when the previous order activity resulted in a Status Code of L (locked) or U (updated in the Shipping & Packing Repository). The results of the query will be automatically used to adjust the processing screen to allow for update of only those items, which are not impending shipment in the Shipping & Packing Repository system. The results of the query will automatically update the Line Item split processing screen to allow A PING is used when the order/order items did not update the Shipping & Packing Repository in the previous order create/change. A ping is used only when the previous order activity resulted in or retained a Status Code of NU (not updated in the Shipping & Packing Repository). If the ping is successful, no information will be displayed upon entering the order and the user is free to make adjustments as needed. If the ping is not successful, a message will be displayed regarding the lack of success. A message will be displayed informing the user that an attempt to Line Item Split should be made later when the middleware and/or the Shipping & Packing Repository are available.

The preferred embodiment of the invention provides a number of important advantages. For example, this embodiment provides the ability to take advantage of the benefits of the use of a synchronous system in a distributed environment without disrupting the asynchronous legacy function or causing legacy rework; and the ability to seamlessly insert additional business into the interface to the Shipping & Packing Information Repository. The invention also provides the required timely reflection of order status, as well as data consistency within the components of the distributed environment; and elimination of the manual procedure required to determine the current order status in the Manufacturing & Shipment systems. The preferred embodiment further provides management of consistent data between the components of the distributed environment; and minimal interchange between the systems with communication engaged only based on specific order updates; i.e., reduction in network traffic and system overhead.

Figure 2:
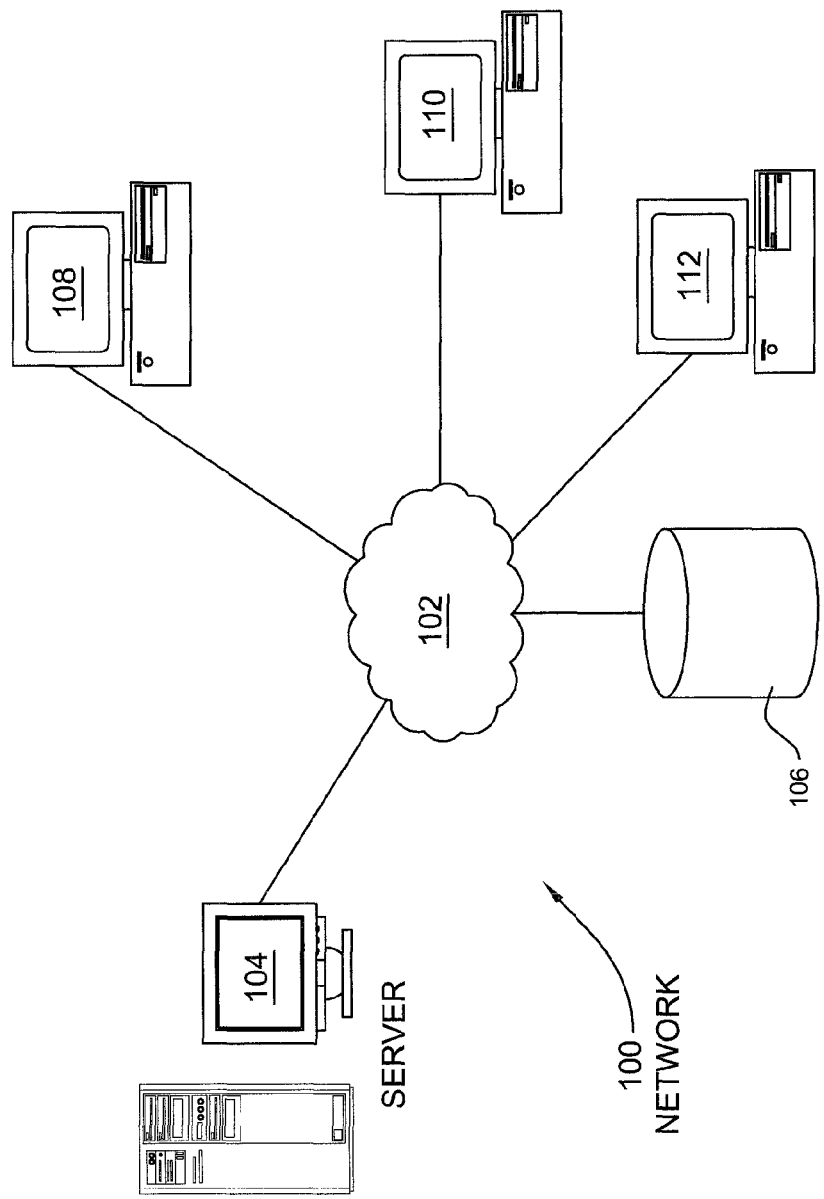
FIG. 2 shows a distributed computing environment with which the present invention may be used.
Figure 3:
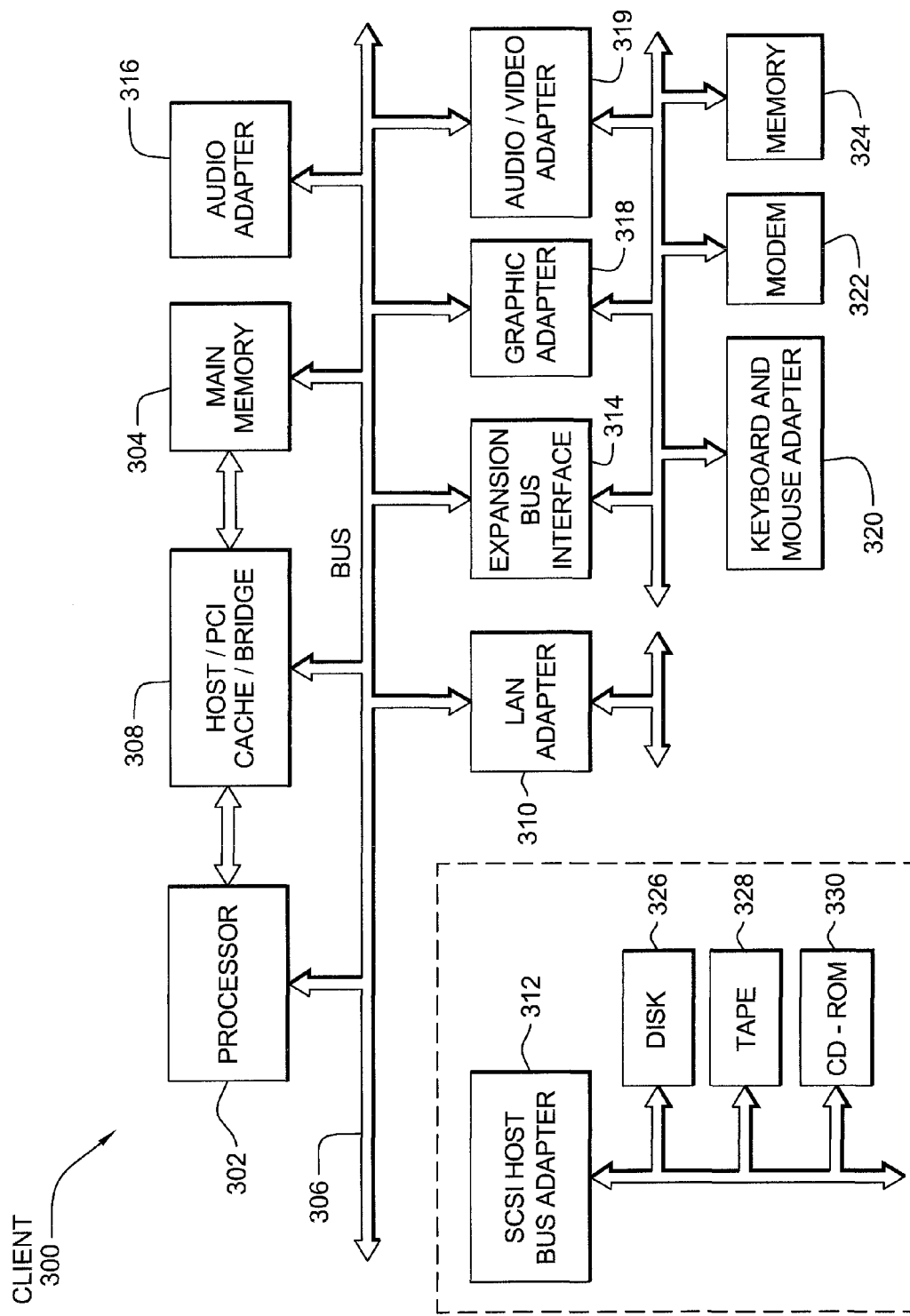
FIG. 3 is a block diagram illustrating a data processing system that may be implemented as a client in accordance with the present invention.

FIGS. 2 and 3 are exemplary diagrams of data processing environments in which embodiments of the invention may be implemented. It should be appreciated that FIGS. 2 and 3 are only exemplary and are not intended to assert or imply any limitation with regard to the environments in which embodiments may be implemented. Many modifications to the depicted environments may be made without departing from the spirit and scope of the present invention.

FIG. 2 depicts a pictorial representation of a network of data processing systems in which illustrative embodiments may be implemented. Network data processing system 100 is a network of computers in which embodiments may be implemented. Network data processing system 100 includes network 102, which is the medium used to provide communications links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 provides data, such as boot files, operating system images, and applications to clients 108, 110, and 112. Clients 108, 110, and 112 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, comprised of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 2 is intended as an example, and not as an architectural limitation for different embodiments.

With reference now to FIG. 3, a block diagram illustrates a data processing system that may be implemented as a client, such as client 108 in FIG. 2, in accordance with the present invention. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations.

The hardware in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system.

In some illustrative examples, data processing system 300 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. The bus system may be implemented using any type of communications fabric or architecture that provides for a transfer of data between different components or devices attached to the fabric or architecture. A communications unit may include one or more devices used to transmit and receive data, such as a modem or a network adapter.

The illustrative embodiments provide for a computer-implemented method, data processing system, and computer usable program code for providing a services model based provisioning in a multi-tenant environment. The computer-implemented methods of the illustrative embodiments may be performed in a data processing system, such as data processing system 100 shown in FIG. 2 or data processing system 300 shown in FIG. 3.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of handling a communication in a distributed computing environment in which disparate interfacing functionality is utilized, the method comprising the steps of:

providing an interface comprised of (i) a fulfillment client, executed in one or more processing units, in which orders are place, (ii) a middleware, executed in said one or more processing units, through which data is passed, (iii) manufacturing and shipment systems in which orders are processed for shipment, and (iv) a shipping and packing information repository system, executed in said one or more processing units, in which data is housed and for housing processing status of the orders and passing said data and processing status to the fulfillment client through the middleware;

for each of the orders, passing a given number of data elements in the customer's order from the fulfillment client to the middleware, establishing the availability of the middleware and the shipping and packing information repository system, the middleware formatting the data into a format that is legible to the shipping and packing information repository system, passing the data to the shipping and packing information repository system for storage and extraction by the manufacturing systems, and wherein each of the orders includes a Status Code field, a Result Code field, and a Result Code Message class; the Status Code field indicates a relevancy of an item of said each order, and a status of said item in the shipping and packing repository system; the Result Code field includes a Result Code issued from the shipping and packing repository system and indicating results of a Request for Comments (RFC) made to the shipping and packing repository system; and the Result Code Message class houses all the Result Codes;

setting a single parameter to enable inclusion of the synchronously interfaced systems into the distributed computing environment;

implementing remote function call functionality to the synchronously interfaced systems during defined points of order processing to establish the status of the interfaced systems availability and the status of the order at the exact time of a predetermined activity;

posting information regarding the order status as both a displayed on-line message to a user and in distinct status fields for future review;

providing the user with flexibility to continue or to discontinue processing a given one of said orders based on the status of said given one of the orders;

supporting limitation of changes allowed for a selected one of the orders that is unavailable for change based on the status of the selected order in a defined process;

supporting the suppression of output to all of the systems in the distributed environment when the system status indicates lack of availability;

supporting the suppression of output to all systems in the distributed environment when the order status indicates the need to suspend output based on the condition of the order or the position of the order in said defined process; and dynamically reacting to failed communication through the resetting one of said orders to a previous state of said one of the orders to ensure data integrity across the distributed computing environment;

invoking a create order process to attempt to create one of the orders with the shipping and packing information repository system, including making a call to the shipping and packing information repository system; wherein the shipping and packing information repository system responds to said call by indicating that the order create either was successful or was not successful; when the response from the shipping and packing information repository system indicates that the order create was successful, updating the Status Code field of said one of the orders with a value indicating that said one of the orders has been updated; and when the response from the shipping and packing information repository system indicates that the order create was not successful, updating the Status Code field of said one of the orders with a value indicating that said one of the orders has not been updated, and updating the Result Code field of said one of the orders with a result code passed back from the shipping and packing information repository system;

invoking an order change process to change a selected one of the orders created with the shipping and packing information repository system, including making a PING call to the shipping and packing information repository system only when a previous attempt to update the selected one of the orders resulted in a value in the Status Code field of the selected one of the orders indicating that said previous attempt did not update the selected one of the orders, said PING call being made to ascertain availability of the middleware and the shipping and packing information repository system; and making a QUERY call to the shipping and packing information repository system to determine a status of an item of the selected one of the orders, said QUERY call being made when said previous attempt to update the selected one of the orders resulted in a value in the Status Code field of the selected one of the orders indicating that said previous attempt did update the selected one of the orders.

2. A method according to claim 1, wherein said synchronously interfaced systems include a manufacturing and shipment system, and a shipping and packing information repository system.

* * * * *

UNITED STATES PATENT AND TRADEMARK OFFICE
CERTIFICATE OF CORRECTION

| | | |
|---|---|---|
| PATENT NO. | : 7,962,378 B2 | Page 1 of 1 |
| APPLICATION NO. | : 11/773480 | |
| DATED | : June 14, 2011 | |
| INVENTOR(S) | : Charles S. Atkinson et al. | |

It is certified that error appears in the above-identified patent and that said Letters Patent is hereby corrected as shown below:

Title Page; should read;

(75) Inventors: Charles S. Atkinson, Apex, NC (US); Hima K. Goverdhana, Cary, NC (US); Daniel P. Huskey, Raleigh, NC (US); Shirish Javalkar, Cary, NC (US); Anandakrishnan Narayanan, Morrisville, NC (US); William J. Reilly, Cary, NC (US); Allen J. Scribner, III, Fuquay-Varina, NC (US); Deirdre A. Wessel, Raleigh, NC (US)

Signed and Sealed this
Eleventh Day of October, 2011

David J. Kappos
*Director of the United States Patent and Trademark Office*